United States Patent
Hiyoshi

(10) Patent No.: US 8,144,134 B2
(45) Date of Patent: Mar. 27, 2012

(54) SENSING CIRCUIT, DISPLAY DEVICE, AND ELECTRONIC APPARATUS

(75) Inventor: Yasunori Hiyoshi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 373 days.

(21) Appl. No.: 12/563,665

(22) Filed: Sep. 21, 2009

(65) Prior Publication Data

US 2010/0123684 A1 May 20, 2010

(30) Foreign Application Priority Data

Nov. 20, 2008 (JP) ................................. 2008-296388

(51) Int. Cl.
*G06F 3/042* (2006.01)
(52) U.S. Cl. ........................................ 345/175; 345/173
(58) Field of Classification Search ........................ None
See application file for complete search history.

(56) References Cited

U.S. PATENT DOCUMENTS

| | | | | |
|---|---|---|---|---|
| 5,900,863 | A * | 5/1999 | Numazaki | 345/158 |
| 7,800,594 | B2 * | 9/2010 | Nakamura et al. | 345/175 |
| 2010/0060611 | A1 * | 3/2010 | Nie | 345/175 |

FOREIGN PATENT DOCUMENTS

JP 2006-244446 A 9/2006

* cited by examiner

*Primary Examiner* — Lixi C Simpson
(74) *Attorney, Agent, or Firm* — Lowe, Hauptman, Ham & Berner, LLP

(57) ABSTRACT

A sensing circuit includes: a data generating section for generating data representing the amount of light received by a plurality of optical detection circuits, which are provided in a detection region, for each unit period on the basis of detection signals output from the plurality of optical detection circuits; a setting section for variably setting a differential unit period number which is the number of unit periods between two unit periods having a difference to be acquired; a difference data generating section for sequentially generating difference data between the data, which is generated by the data generating section in the current unit period, and the data, which is generated by the data generating section in the unit period previous to the current unit period by the differential unit period number, for each of a plurality of the unit periods; and an approach detecting section for detecting whether or not an object is approaching the detection region on the basis of the difference data generated by the difference data generating section.

7 Claims, 15 Drawing Sheets

SENSING CIRCUIT, DISPLAY DEVICE, AND ELECTRONIC APPARATUS

BACKGROUND

1. Technical Field

The present invention relates to a technique for detecting the approach of an object.

2. Related Art

Generally, display devices are known which detect when an object such as a finger or a pen approaches a screen. An example of such display devices is disclosed in Japanese Unexamined Patent Application Publication No. 2006-244446. In the display device, the data, which represents the amount of light received by a plurality of optical sensors built into the display screen, is converted into multi-tone images, and whether or not an object is approaching the screen is detected on the basis of the difference data between a multi-tone image, which is selected from a random time point, and the multi-tone image previous to the selected multi-tone image by one or two frames.

The technique disclosed in Japanese Unexamined Patent Application Publication No. 2006-244446 is able to detect that an object is approaching a sensing region when an area of an overlapped region between a region corresponding to the movement of the object in the difference data and the sensing region on the screen is not less than a predetermined value. However, in the technique disclosed in Japanese Unexamined Patent Application Publication No. 2006-244446, the number of frames between the two frames, of which the difference is to be acquired, is set to an initial value. Hence, for example, each frame time length may be short. This causes problems in that it is difficult to set an area of the region, which corresponds to the movement of the object in the difference data of the multi-tone images of each of the two frames having a difference to be acquired, to a value appropriate for the detection of the approach of the objection to the sensing region, and it is also difficult to precisely detect the approach between the object and the sensing region.

SUMMARY

An advantage of some aspects of the invention is that it can adequately detect the approach of an object regardless of the time length of the unit period.

In order to solve the above-mentioned problems, a sensing circuit according to an aspect of the invention includes: a data generating section for generating data representing the amount of light received by a plurality of optical detection circuits, which are provided in a detection region, for each unit period on the basis of detection signals output from the plurality of optical detection circuits; a setting section for variably setting a differential unit period number which is the number of unit periods between two unit periods having a difference to be acquired; a difference data generating section for sequentially generating difference data between the data, which is generated by the data generating section in the current unit period, and the data, which is generated by the data generating section in the unit period previous to the current unit period by the differential unit period number, for each of a plurality of the unit periods; and an approach detecting section for detecting whether or not an object is approaching the detection region on the basis of the difference data generated by the difference data generating section.

According to this aspect of the invention, it is possible to variably set the differential unit period number (which is the number of unit periods between two unit periods having a difference to be acquired) so that the area of the region, which corresponds to the movement of the object in the difference data between the two unit periods having the difference to be acquired, reaches a value appropriate for the detection of the approach between the object and the detection region. Accordingly, there is an advantage that it is possible to precisely detect the approach between the object and the detection region. Furthermore the approach detecting section may detect not only the approach between the object and the detection region but also contact between the object and the detection region. In sum, the "approach" said herein is defined to include "contact" between the object and the detection region.

In the sensing circuit according to this aspect of the invention, it is preferred that the setting section variably sets the differential unit period number in accordance with the time length of the unit period. More specifically, it is preferred that the setting section sets the differential unit period number to a larger value as the time length of the unit period becomes shorter. According to this aspect, when the time length of the unit period is short, the differential unit period number is set to a large value. Thus, it is possible to set the area of the region, which corresponds to the movement of the object in the difference data between the two unit periods having the difference to be acquired, to a value appropriate for the detection of the approach between the object and the detection region. Further, when the time length of the unit period is long, the differential unit period number is set to a small value. Thus, it is possible to shorten dead time right after power supply until first approach detection. Specifically, according to this aspect, it is possible to achieve both an increase in speed and an increase in the precision of the approach detection regardless of the time length of the unit period.

In the sensing circuit according to this aspect of the invention, it is preferred that the approach detecting section detects that the object approaches a sensing region (for example, the region S shown in FIG. 8), which is at least a part of the detection region, when an area of an overlapped region between the sensing region and another region (for example, the region df1 shown in FIG. 8), which corresponds to the movement of the object in the difference data generated by the difference data generating section, is not less than a predetermined value.

In the sensing circuit according to this aspect of the invention, it is preferred that the sensing circuit further include an illuminance change detecting section for detecting change in environmental illuminance on the basis of the data generated by the data generating section. In addition, it is also preferred that the approach detecting section stop detecting that the object approaches the detection region, during a period from the current unit period to the unit period subsequent to the current unit period by the differential unit period number, when the illuminance change detecting section detects a change in the environmental illuminance.

For example, since the environmental illuminance changes, it may be difficult to distinguish between the surrounding region and the region corresponding to the movement of the object in the difference data between the unit periods before the change and the unit periods after the change. In this case, it is difficult to precisely detect whether or not the object and the detection region approach each other during the period from the unit period after the change of the environmental illuminance to the unit period subsequent thereto by the differential unit period number. Thus, in the aspect of detecting the approach between the object and the detection region for each unit period, false detection continues from the unit period in which the change in the environmental illuminance is detected, to the unit period subsequent thereto by the differential unit period number, regardless of change in the environmental illuminance. In contrast, in this aspect of the invention, when a change in the environmental illuminance is detected, the detection of the approach between the object and the detection region is stopped during the period from the current unit period to the unit period subsequent thereto by the differential unit period number. As a result, there is an advantage that the false detection is not likely to be continued during this period.

The sensing circuit according to the aspect of the invention may be used in various display devices. Further, the display device according to the aspect of the invention may be used in various electronic apparatuses. Examples of the various apparatuses include a personal computer, a mobile phone, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
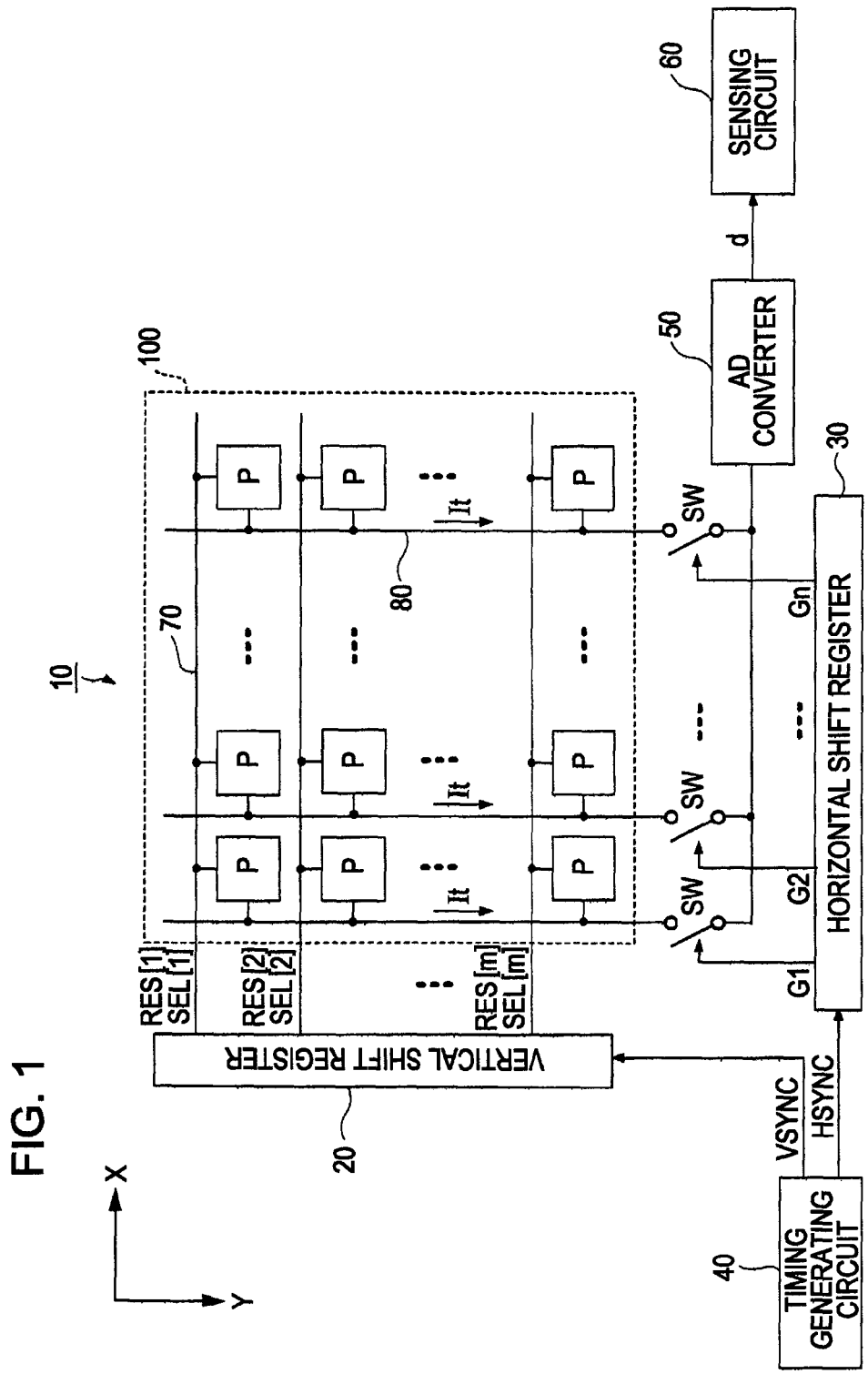
FIG. 1 is a block diagram illustrating a schematic configuration of a display device according to a first embodiment.

FIG. 1 is a block diagram illustrating a configuration of a display device 10 according to a first embodiment of the invention. The display device 10 includes a detection region 100, a plurality of optical detection circuits P, a vertical shift register 20, a horizontal shift register 30, a timing generating circuit 40, an AD converter 50, and a sensing circuit 60. Although detailed illustration is omitted, a plurality of scanning lines and a plurality of data lines are wired, and pixel circuits are respectively disposed at the intersection points of those in the detection region 100 shown in FIG. 1. The display device 10 according to the embodiment has both a function for displaying an image and a function for detecting the approach of an object.

As shown in FIG. 1, the detection region 100 is provided with m control lines 70, which extend in the X direction, and n signal lines 80 which extend in the Y direction orthogonal to the X direction (m and n are two or more natural numbers). Each optical detection circuit P is disposed at each position corresponding to intersections of the control lines 70 and the signal lines 80. Accordingly, these optical detection circuits P are arranged in a matrix of m rows, which are vertically arranged, and n columns which are horizontally arranged.

Figure 2:
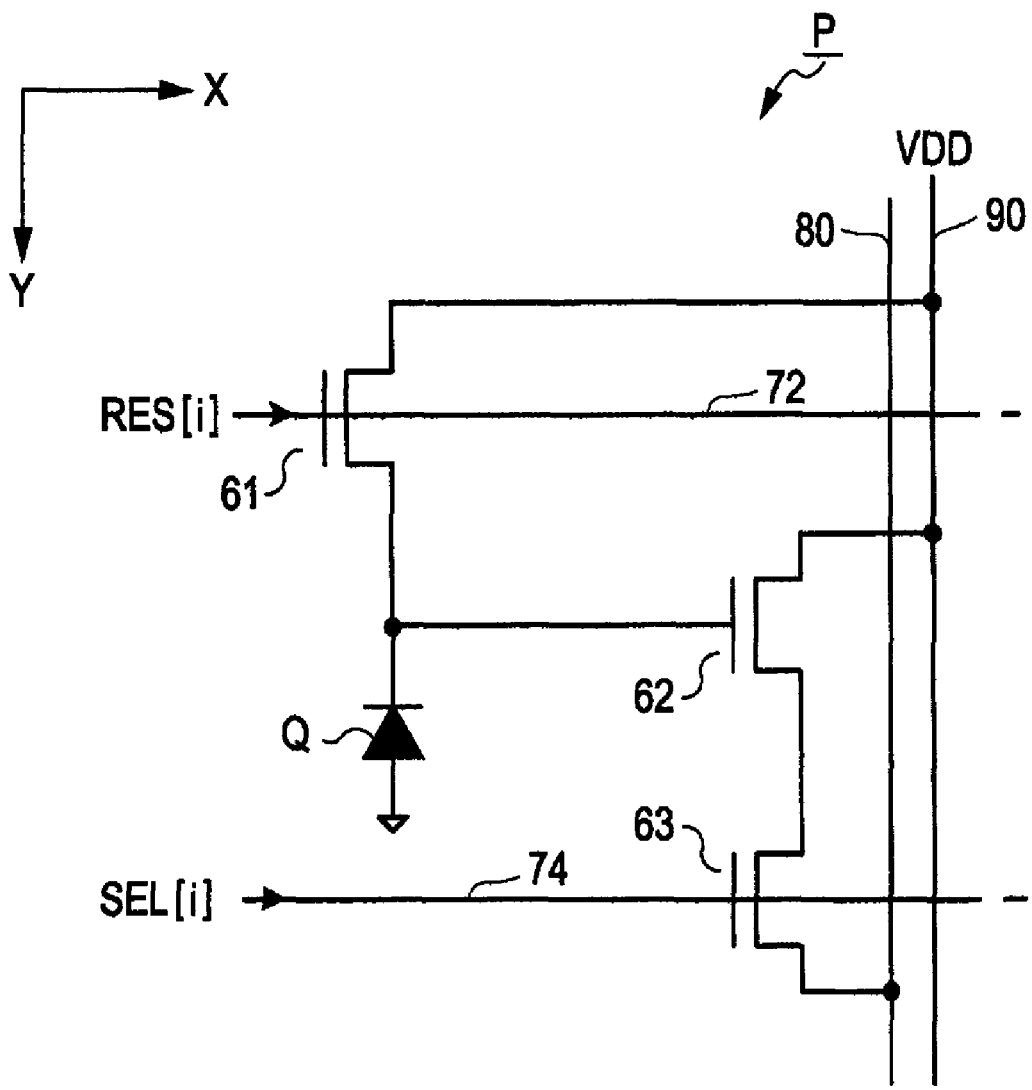
FIG. 2 is a diagram illustrating a configuration of an optical detection circuit according to the first embodiment.

The vertical shift register 20 shown in FIG. 1 outputs reset signals RES and selection signals SEL for driving the optical detection circuits P to the control lines 70, on the basis of a signal VSYNC supplied from the timing generating circuit 40. As shown in FIG. 2, each control line 70 is formed of a reset line 72 and a selection line 74 which extend in the X direction. The reset line 72 of the i-th row ($1 \leq i \leq m$) control line 70 is supplied with a reset signal RES[i], and the selection line 74 of the i-th row control line 70 is supplied with a selection signal SEL[i].

Figure 3:
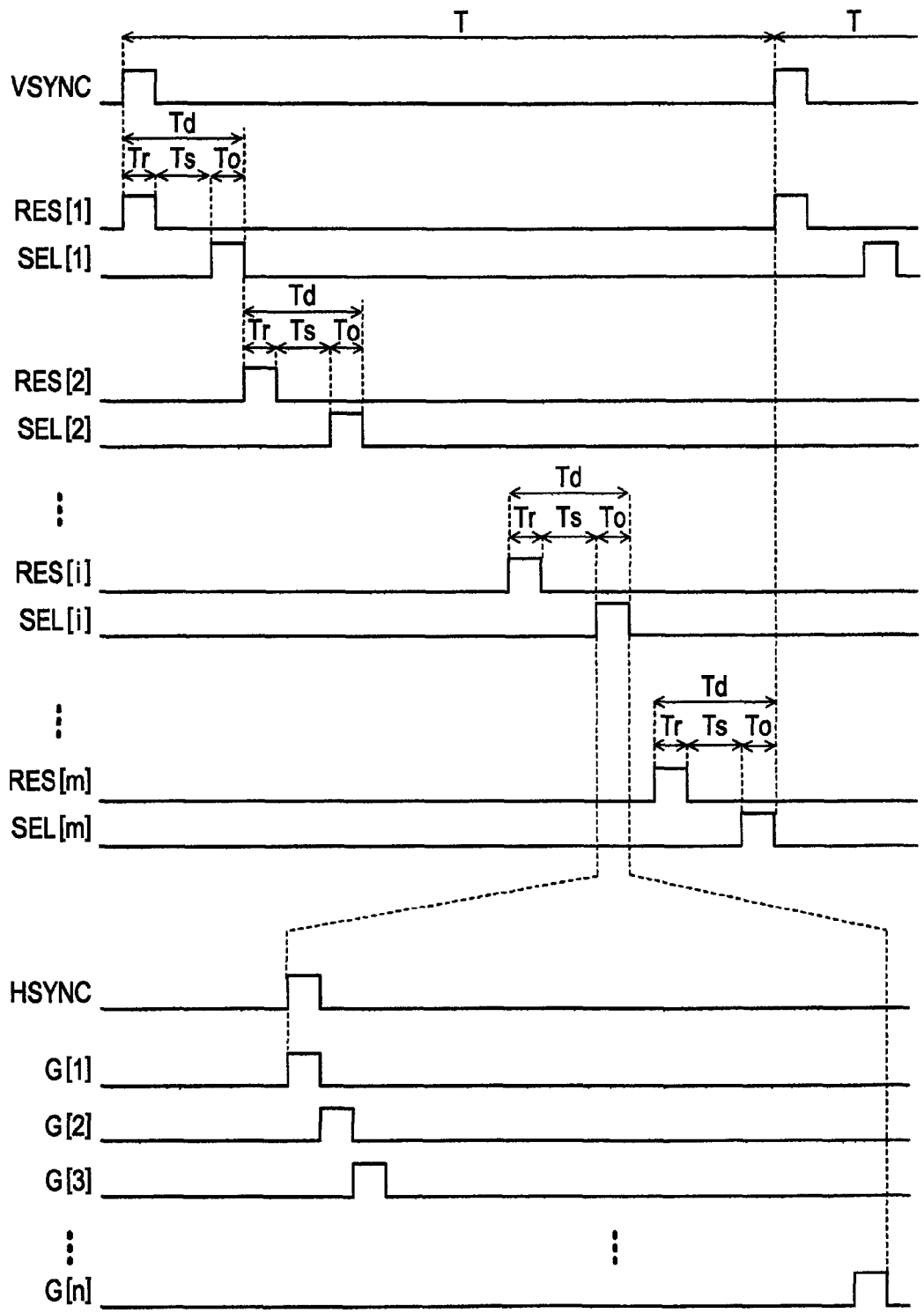
FIG. 3 is a diagram illustrating detailed waveforms of signals used for the detection of the approach of an object.

FIG. 3 is a diagram illustrating a specific waveform of the signals used for detecting the approach of the object. As shown in FIG. 3, the signal VSYNC defines unit periods T. As shown in FIG. 3, in the unit period T, the reset signals RES[1] to RES[m] and the selection signals SEL[1] to SEL[m] sequentially transit to an active level (a high level).

As shown in FIG. 3, an operation period Td is set for each of m rows in each unit period T. Each operation period Td is formed of a reset period Tr, a sensing period Ts, and a readout period To. In the reset period Tr of the i-th row operation period Td, the reset signal RES[i] is set to the high level. In the sensing period Ts subsequent to the reset period Tr, the reset signal RES[i] and the selection signal SEL[i] are set to a low level. In the readout period To subsequent to the sensing period Ts, the selection signal SEL[i] is set to a high level. The operation periods Td of the other rows are the same as the above.

FIG. 2 is a circuit diagram illustrating the optical detection circuit P. FIG. 2 shows one optical detection circuit P which belongs to the i-th row. The optical detection circuit P includes an N channel type reset transistor 61, an N channel type amplification transistor 62, an N channel type selection transistor 63, and a light receiving element (for example, a photodiode) Q for outputting a light receiving signal having a magnitude according to the amount of light received.

As shown in FIG. 2, the reset transistor 61 is interposed between a power line 90 which is supplied with a power source potential VDD and a gate of the amplification transistor 62. A gate of the reset transistor 61 is connected to the reset line 72. The amplification transistor 62 is interposed between the power line 90 and the selection transistor 63. The gate of the amplification transistor 62 is connected with the light receiving element Q. As shown in FIG. 2, the selection transistor 63 is interposed between the amplification transistor 62 and the signal line 80. A gate of the selection transistor 63 is connected to the selection line 74.

Figure 4:
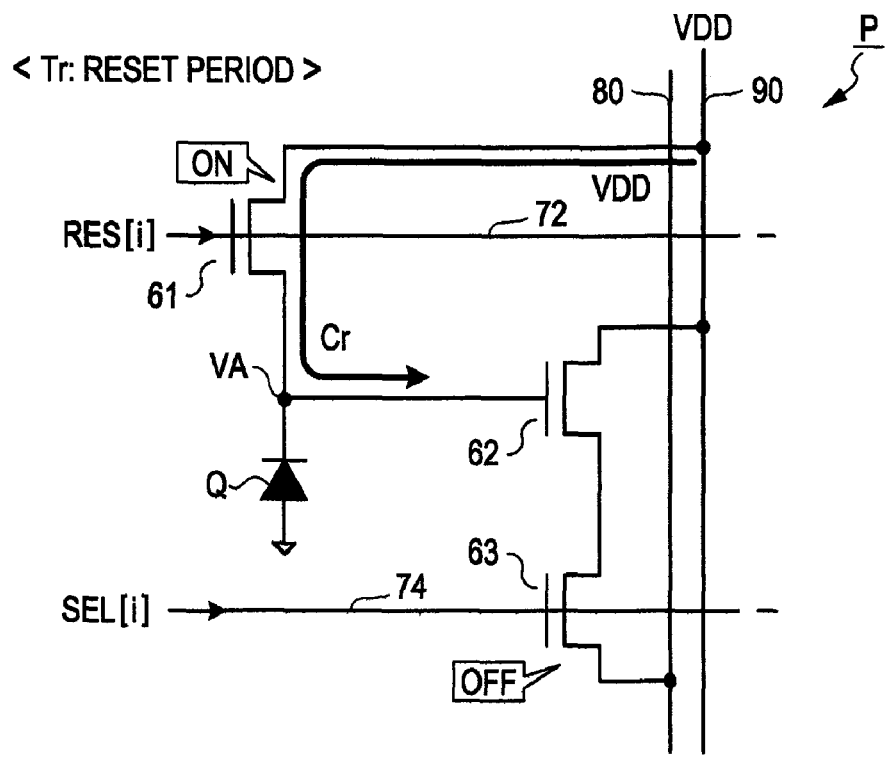
FIG. 4 is a diagram illustrating an operation of the optical detection circuit in a reset period.

Next, an operation of the optical detection circuit P will be described with reference to FIGS. 3 to 6. As shown in FIG. 3, in the reset period Tr, the reset signal RES[i] is set to a high level. Hence, the reset transistor 61 is turned on. Thereby, as shown in FIG. 4, an electric potential VA of the gate of the amplification transistor 62 is set (reset) to the power source potential VDD.

Figure 5:
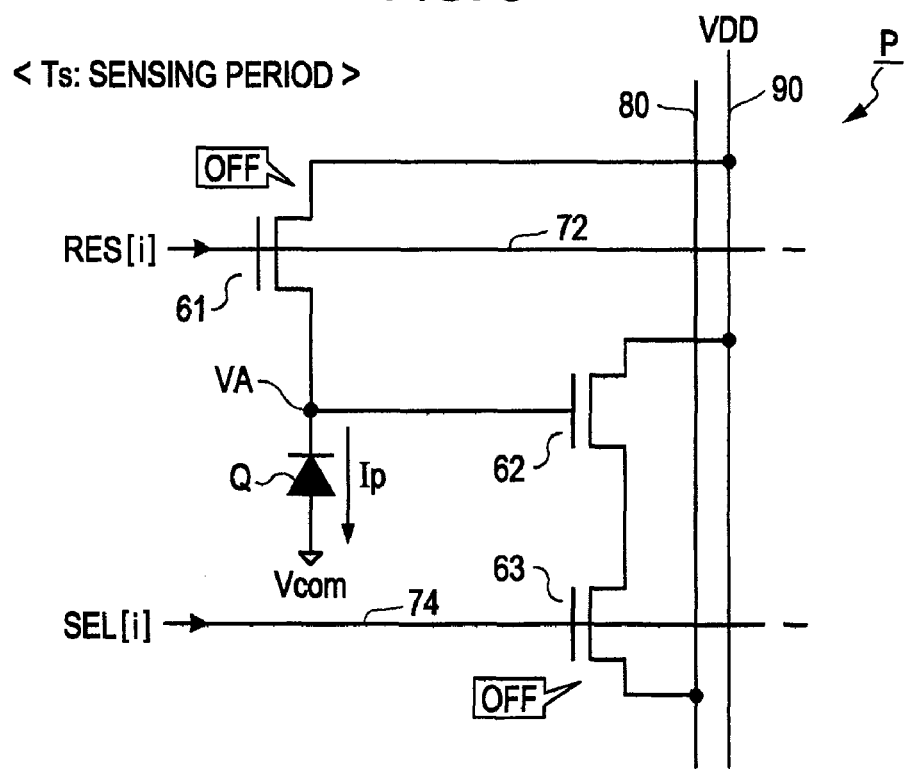
FIG. 5 is a diagram illustrating an operation of the optical detection circuit in a sensing period.

As shown in FIG. 3, in the sensing period Ts, the reset signal RES[i] and the selection signal SEL[i] change to a low level. Thus, as shown in FIG. 5, the reset transistor 61 and the selection transistor 63 are turned off. At this time, the electric potential VA of the gate of the amplification transistor 62 is set to a value depending on a photoconductive current Ip of the light receiving element Q. The photoconductive current Ip of the light receiving element Q depends on the amount of light incident on the light receiving element Q.

Figure 6:
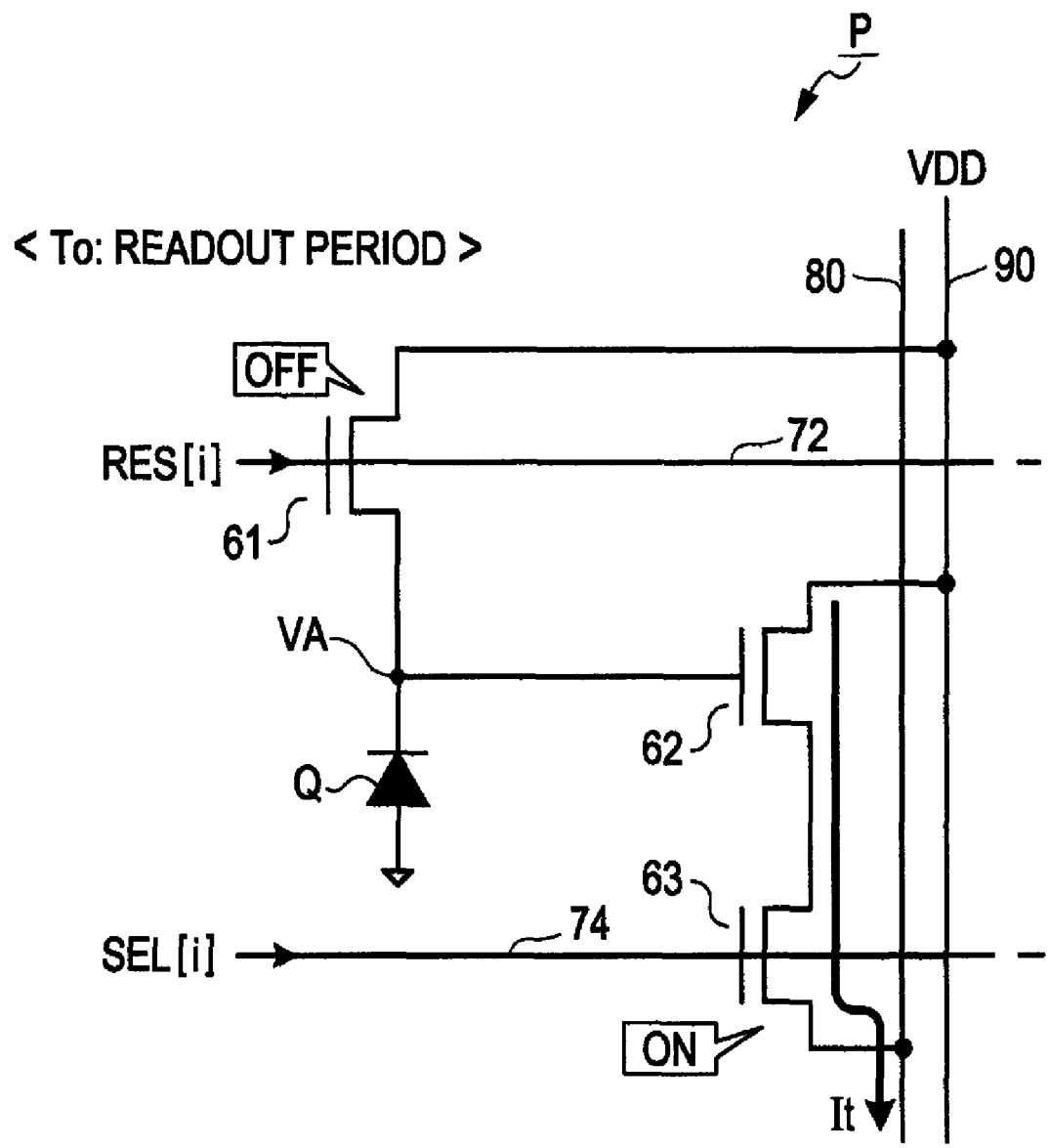
FIG. 6 is a diagram illustrating an operation of the optical detection circuit in a readout period.

As shown in FIG. 3, in the readout period To, the selection signal SEL[i] changes to a high level. Hence, as shown in FIG. 6, the selection transistor 63 is turned on. At this time, a detection current It, which has a magnitude depending on the electric potential VA of the gate of the amplification transistor 62, flows in a signal line 80.

In the sensing period Ts, when an object such as a finger comes into contact with or approaches the detection region 100 with the shadow of the object cast on the detection region 100, the photoconductive currents Ip of the light receiving elements Q change in accordance with the change of the amount of light received by the light receiving elements Q which corresponds to the area covered with the shadow. In accordance with this, the electric potential VA of the gate of the amplification transistor 62 also changes. In addition, in the readout period To, the detection current It depending on the light receiving amount is output to the signal line 80.

As shown in FIG. 1, switches SW are provided between the n signal lines 80 and the AD converter 50. Each of the n switches SW is turned on when an operation signal G supplied from the horizontal shift register 30 transits to the active level. The horizontal shift register 30 shown in FIG. 1 outputs the operation signals G[1] to G[n] to the switches SW on the basis of a signal HSYNC which is supplied from the timing generating circuit 40. As shown in FIG. 3, in each readout period To defined by the signal HSYNC, the operation signals G[1] to G[n] sequentially change to an active level (a high level). Accordingly, in the each readout period To, the n switches SW are sequentially turned on. Hence, the detection currents It (an analog value), which are output to the signal lines 80 in the readout periods To, are sequentially output to the AD converter 50 through the switches SW, are converted into a detection value d (a digital value) by the AD converter 50, and then the detection value d is supplied to the sensing circuit 60. In the embodiment, the detection value d is set to a smaller value as the amount of light received by the optical detection circuit P becomes smaller.

Figure 7:
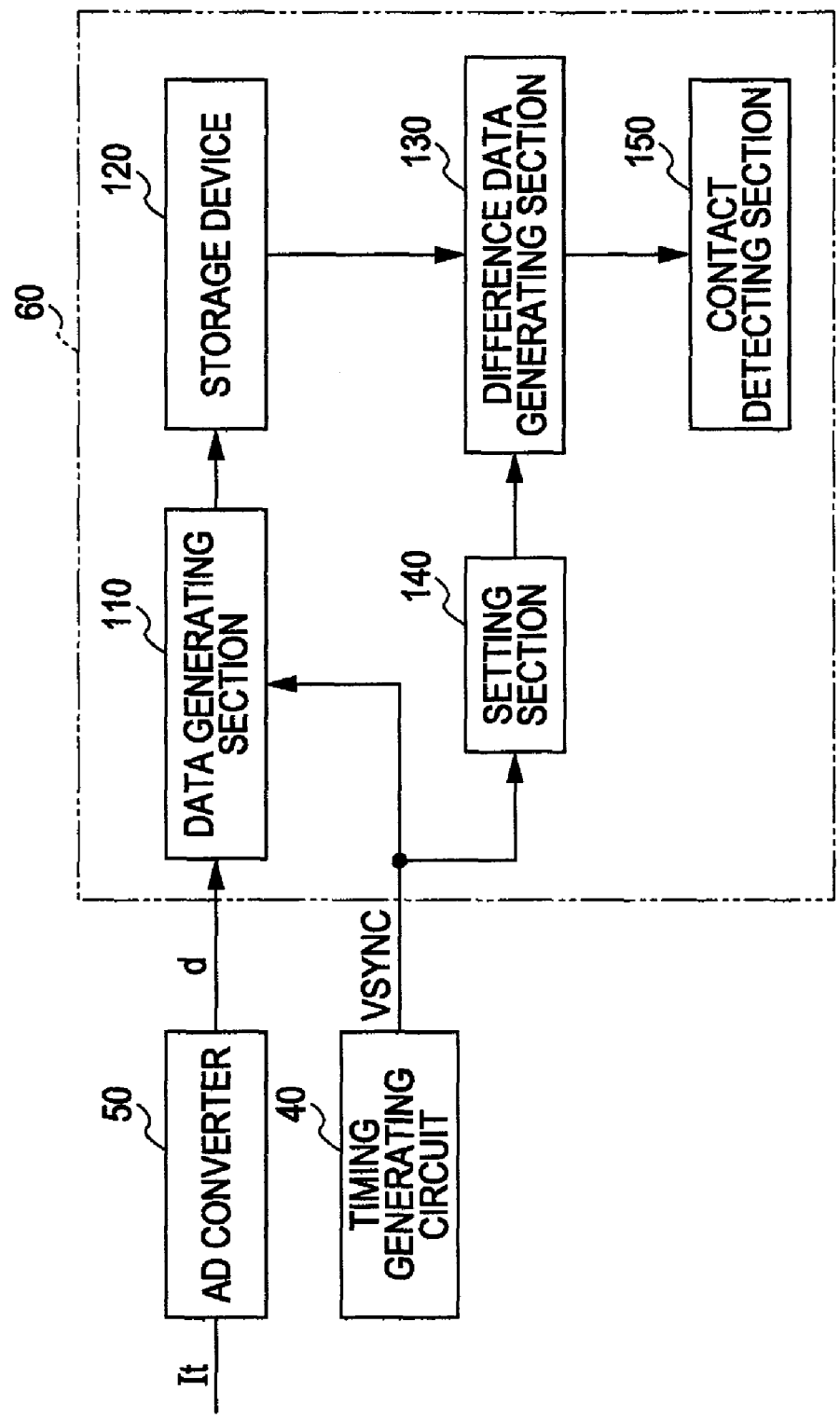
FIG. 7 is a diagram illustrating a configuration of a sensing circuit according to the first embodiment.
Figure 8:
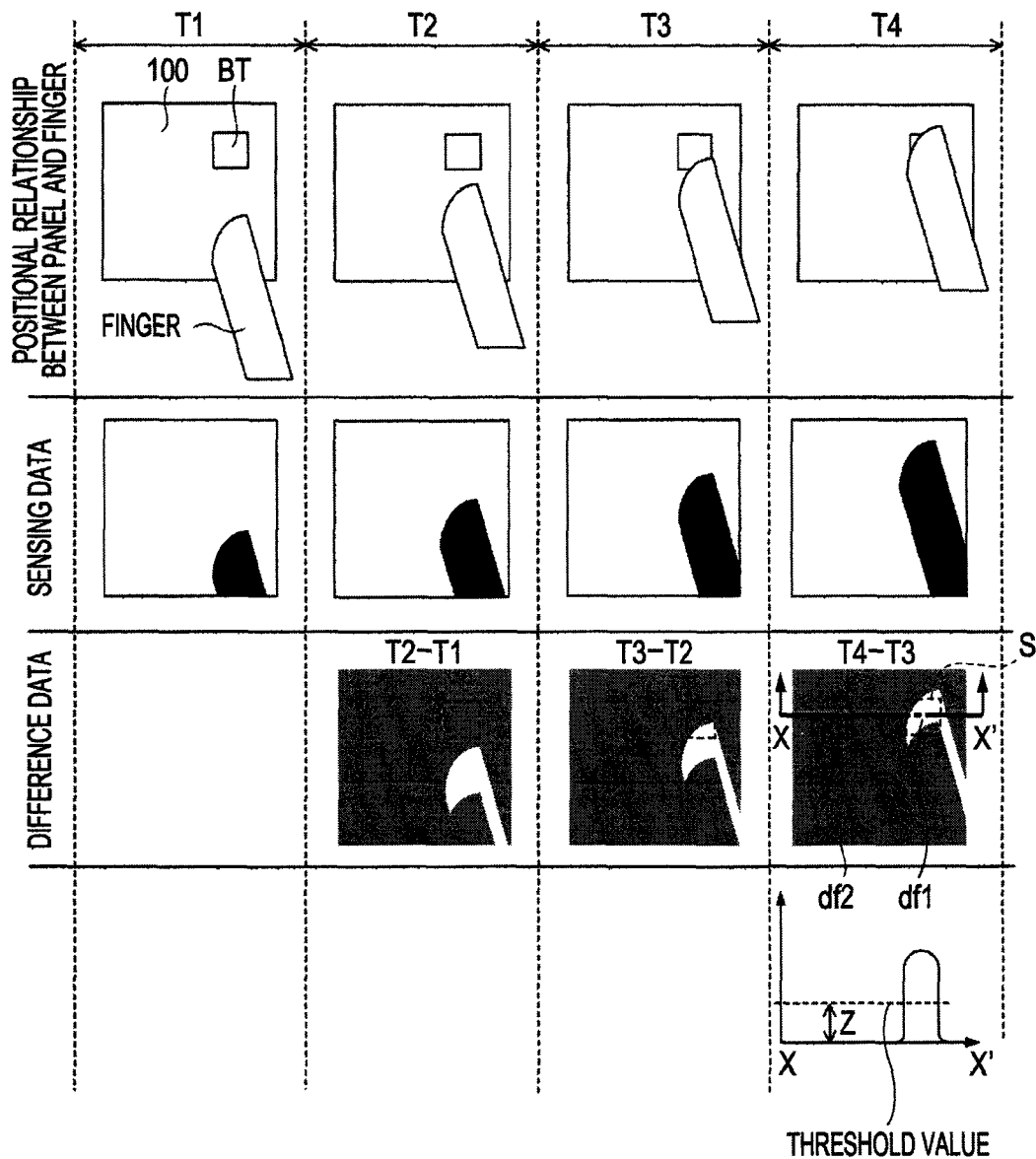
FIG. 8 is a diagram illustrating a state where an object approaches a detection region.

FIG. 7 is a block diagram illustrating the sensing circuit 60. As shown in FIG. 7, the sensing circuit 60 includes a data generating section 110, a storage device 120, a difference data generating section 130, a setting section 140, and a contact detecting section 150. FIG. 8 is a diagram illustrating a state where a user's finger (an object) approaches the operation button BT displayed in the detection region 100 during the unit periods T1 to T4.

The data generating section 110 shown in FIG. 7 generates sensing data SD by sectionalizing the detection value d, which is serially output from the AD converter 50, for each unit period T defined by the signal VSYNC. Accordingly, the sensing data SD is a set of m×n detection values d, which represents the amount of light received by the optical detection circuits P, in one unit period T. The storage device 120 shown in FIG. 7 stores a plurality of sensing data SD generated in the data generating section 110.

FIG. 8 shows an image represented by the sensing data. In the image, as the detection value d becomes smaller (the light receiving amount of the optical detection circuit P becomes smaller), the tone becomes lower (the tone becomes closer to black). The amount of light received by the optical detection circuits P within the area, which is covered with the shadow of the object in the detection region 100, is smaller than the amount of light received by the optical detection circuits P within the surrounding area other than the object. Hence, the low tone region (which is a region represented by black in FIG. 8) in the image represented by the sensing data SD represents the region covered with the shadow of the object. In addition, the high tone region (which is a region represented by white in FIG. 8) represents the surrounding region.

The difference data generating section 130 shown in FIG. 7 reads out the sensing data SD in the current period T and the sensing data SD in the unit period T previous to the current unit period T by the differential unit period number N from the storage device 120 for each of the plurality of unit periods T, and sequentially generates difference data for both. The differential unit period number N represents the number of the unit periods T between the two unit periods T having a difference to be acquired, and is set by the setting section 140 shown in FIG. 7. When the differential unit period number N is "0", the difference data is generated between the sensing data SD generated in a certain unit period T and the sensing data SD generated in the unit period T just previous to the certain unit period T. When the differential unit period number N is "1", the difference data is generated between the sensing data SD generated in the certain unit period T and the sensing data SD generated in the unit period T previous to the certain unit period T by two unit periods.

The difference data is a set of difference values of the detection values d which represents the amount of light received by the optical detection circuits P. When the amount of light received by the optical detection circuits P does not change between the two unit periods T having the difference to be acquired, the difference value is equal to 0. In contrast, when the light receiving amounts are changed by the shadow of the object, the difference value is equal to a value which represents the difference between the tone corresponding to the shadow of the object and the tone of the surrounding region. FIG. 8 shows an image represented by the difference data. In the image, as the difference value becomes closer to 0, the tone becomes lower (the tone becomes closer to black). Furthermore, in FIG. 8, the differential unit period number N is set to "0".

The contact detecting section 150 shown in FIG. 7 detects whether or not the object approaches on the basis of the difference data generated by the difference data generating section 130. The contact detecting section 150 compares a threshold value Z and the difference values constituting the difference data, and extracts a region, which corresponds to the difference values more than the threshold value Z, as a region df1, which corresponds to movement of the object, as shown in FIG. 8. Then, when an area of an overlapped region between the region df1 and a region S, which corresponds to the operation button BT, is not less than a predetermined value (for example, ⅔ or more of the region S), the contact detecting section 150 detects that an object is coming into contact with the operation button BT. Here, the area of the region df1 increases as the speed of the movement of the object becomes higher and as the differential unit period number N or the time length of the unit period T increases. Furthermore, the contact detecting section 150 extracts the region which corresponds to the difference values less than the threshold value Z among the difference values constituting the difference data, as a region df2 which represents the surrounding region.

The setting section 140 shown in FIG. 7 variably sets the differential unit period number N. More specifically, the setting procedure is as follows. First, the setting section 140 detects the time length of the unit period T on the basis of the signal VSYNC which is output from the timing generating circuit 40. Here, the time length of the unit period T may be changed. For example, the sensing circuit 60 may be assembled in a panel in which the time length of the unit period T is set to 0.1 second, and may be assembled in a panel in which the time length of the unit period T is set to 1/60 second. In both cases, the time lengths of the unit periods T, which are detected by the setting section 140, are different from each other. Furthermore, for example, in a panel having the sensing circuit 60 assembled therein, the time length of the unit period T, which is detected by the setting section 140, may be changed even when the time length of the unit period T is variably set in response to the request of an application and the like. In addition, the setting section 140 variably sets the differential unit period number N in accordance with the detected time length of the unit period T.

Figure 9:
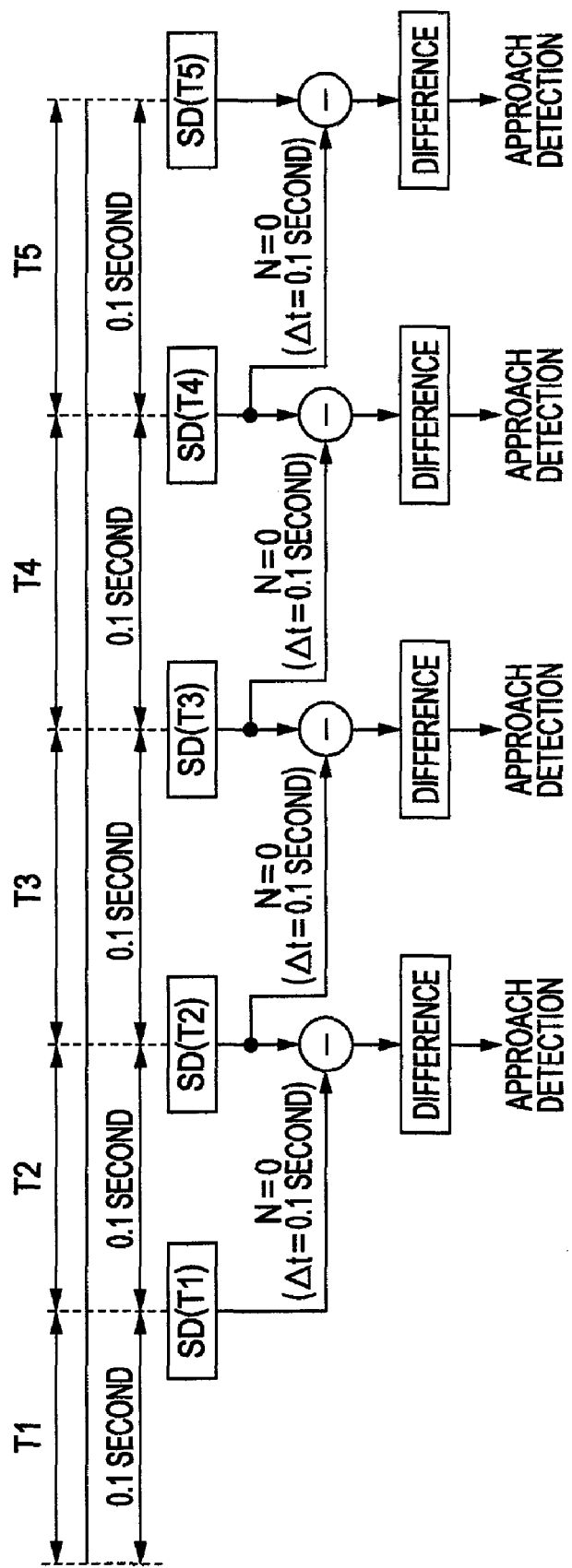
FIG. 9 is a diagram illustrating an operation of the sensing circuit according to the first embodiment.
Figure 10:
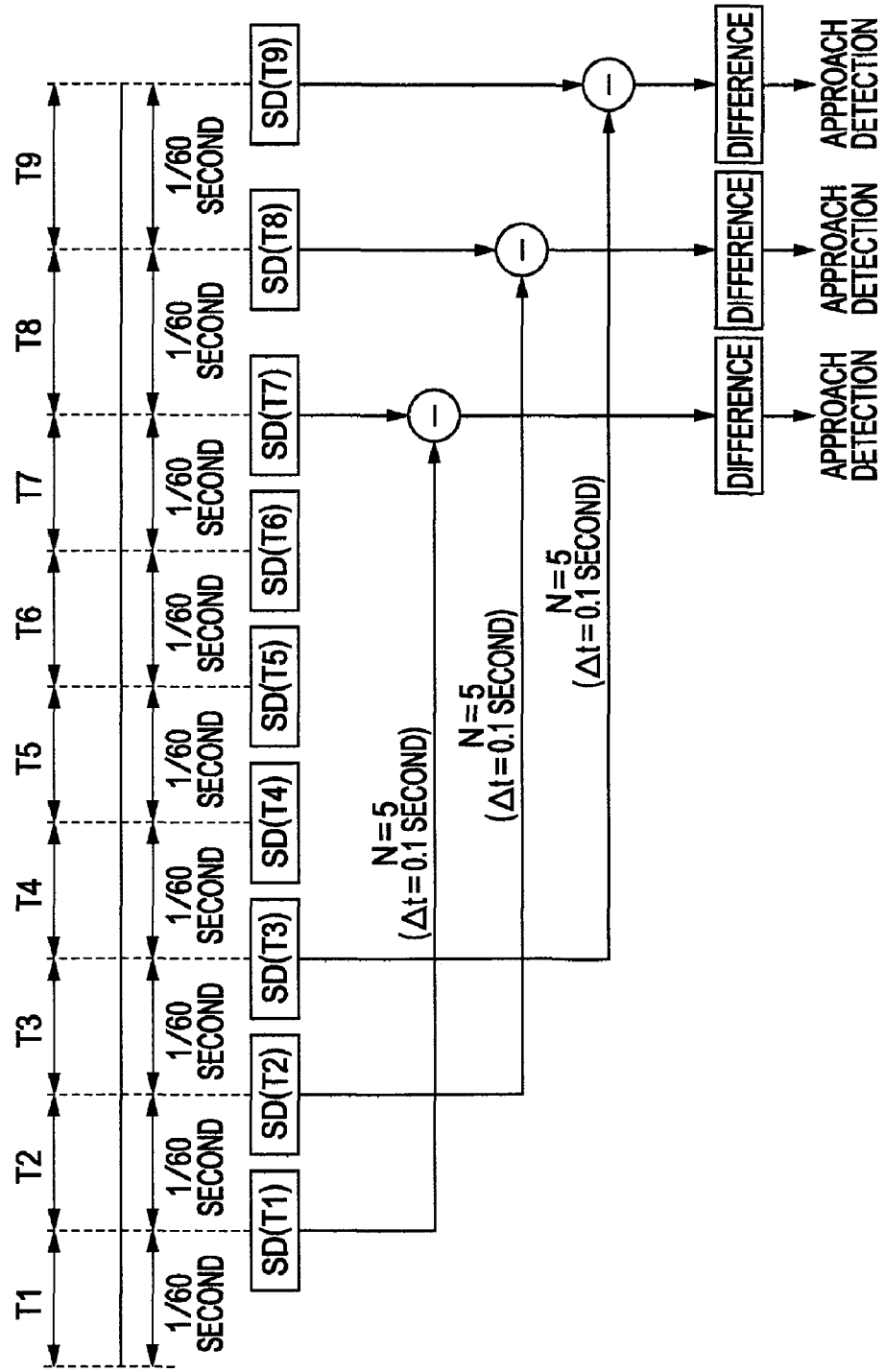
FIG. 10 is a diagram illustrating an operation of the sensing circuit according to the first embodiment.

In the present embodiment, the differential unit period number N is set to a larger value as the time length of the unit period T becomes shorter. For example, the time length of each unit period T may be 0.1 second (10 Hz). In this case, as shown in FIG. 9, the differential unit period number N is set to "0". In contrast, the time length of each unit period T may be set to 1/60 second (60 Hz). In this case, as shown in FIG. 10, the differential unit period number N is set to "5".

Here, the time it takes until the shadow of the object is overlapped with ⅔ of the region S after being just about to be cast on the region S is set to 0.1 second (10 Hz). Then, when an interval Δt (which is a time length from the end point of one unit period T to the end point of the other unit period T) between the two unit periods T having the difference to be acquired is not less than 0.1 second, the area of the region df1, which corresponds to the movement of the object in the difference data between the two unit periods T having the difference to be acquired, is not less than that of ⅔ of the region S.

When the time length of each unit period T is 0.1 second, the differential unit period number N is set to "0" as shown in FIG. 9. Hence, the interval Δt between the two unit periods T having the difference to be acquired (for example, the unit periods T1 and T2 shown in FIG. 9) is 0.1 second, and the area of the region df1 corresponds to ⅔ of the region S. Further, when the time length of the unit period T is 1/60 second, the differential unit period number N is set to "5" as shown in FIG. 10. Hence, the interval Δt between the two unit periods T having the difference to be acquired (for example, the unit periods T1 and T7 shown in FIG. 10) is 0.1 second (1/60 second×6), and the area of the region df1 corresponds to ⅔ of the region S. Consequently, according to the embodiment, even when the time length of each unit period corresponds to any one of 0.1 second and 1/60 second, it is possible to detect the approach between the object and the region S.

Next, an aspect (hereinafter, it is referred to as a "comparative example") is considered in which the differential unit period number N is fixed at an initial value. First, in the comparative example, it is considered that the differential unit period number N is fixed at "0". When the time length of each unit period T is 0.1 second, similarly to the embodiment shown in FIG. 9, the interval Δt between the two unit-periods T having the difference to be acquired is 0.1 second, and the area of the region df1 corresponds to ⅔ of the region S. Accordingly, it is possible to detect the approach between the object and the region S. However, when the time length of each unit period T is 1/60 second, the interval Δt between the two unit periods T having the difference to be acquired is also 1/60 second, and thus is lower than 0.1 second. Hence, the area of the region df1 does not reach a value (⅔ of the region S) appropriate for the detection of the approach between the object and the region S. Accordingly, when the time length of each unit period T is 1/60 second, a problem arises in that the approach between the object and the region S can not be detected.

In contrast, in the embodiment, as the time length of the unit period T becomes shorter, the differential unit period number N is set to a larger value. Hence, when the time length of each unit period T is 1/60 second, the differential unit period number N is set to "5" as described above. Accordingly, it is possible to make the area of the region df1 reach the value appropriate for the detection of the approach between the object and the region S, and thus it is possible to detect the approach between the object and the region S. As a result, according to the embodiment, there is an advantage that it is possible to precisely detect the approach between the object and the region S, regardless of the time length of the unit period T.

Next, in the comparative example, it is considered that the differential unit period number N is fixed at "5". When the time length of each unit period T is 1/60 second, similarly to the embodiment shown in FIG. 10, the interval Δt between the two unit periods T having the difference to be acquired is 0.1 second, and the area of the region df1 corresponds to ⅔ of the region S. As a result, it is possible to detect the approach between the object and the region S.

On the other hand, even when the time length of each unit period T is 0.1 second, the interval Δt between the two unit periods T having the difference to be acquired is not less than 0.1 second (0.1 second×6). Accordingly, it is possible to detect the approach between the object and the region S. At this time, when power is supplied to the sensing circuit 60 at the start point of the unit period T1, the detection of the approach between the object and the region S (hereinafter, it is referred to as "approach detection") is performed at the end point of the unit period T7 since the differential unit period number N is set to "5". That is, the approach detection is not performed during the period right after the supply of power until the end point of the unit period T7. Then, as the time length of the unit period T becomes longer, dead time right after the supply of power until the first approach detection increases. Hence, from the view point of reducing the dead time, the configuration according to the embodiment is remarkably effective in that the differential unit period number N is set to a smaller value as the time length of the unit period T becomes longer. As described above, in the embodiment, when the time length of each unit period T is 0.1 second, the differential unit period number N is set to "0". Hence, when the power is supplied at the start point of the unit period T1, the first approach detection is performed at the end point of the unit period T2 as shown in FIG. 9. As a result, there is an advantage that the dead time right after the supply of the power until the first approach detection can be reduced as compared with the comparative example.

As described above, according to the embodiment, it is possible to achieve both an increase in speed and an increase in the precision of the approach detection regardless of the time length of the unit period T.

B. Second Embodiment

Figure 11:
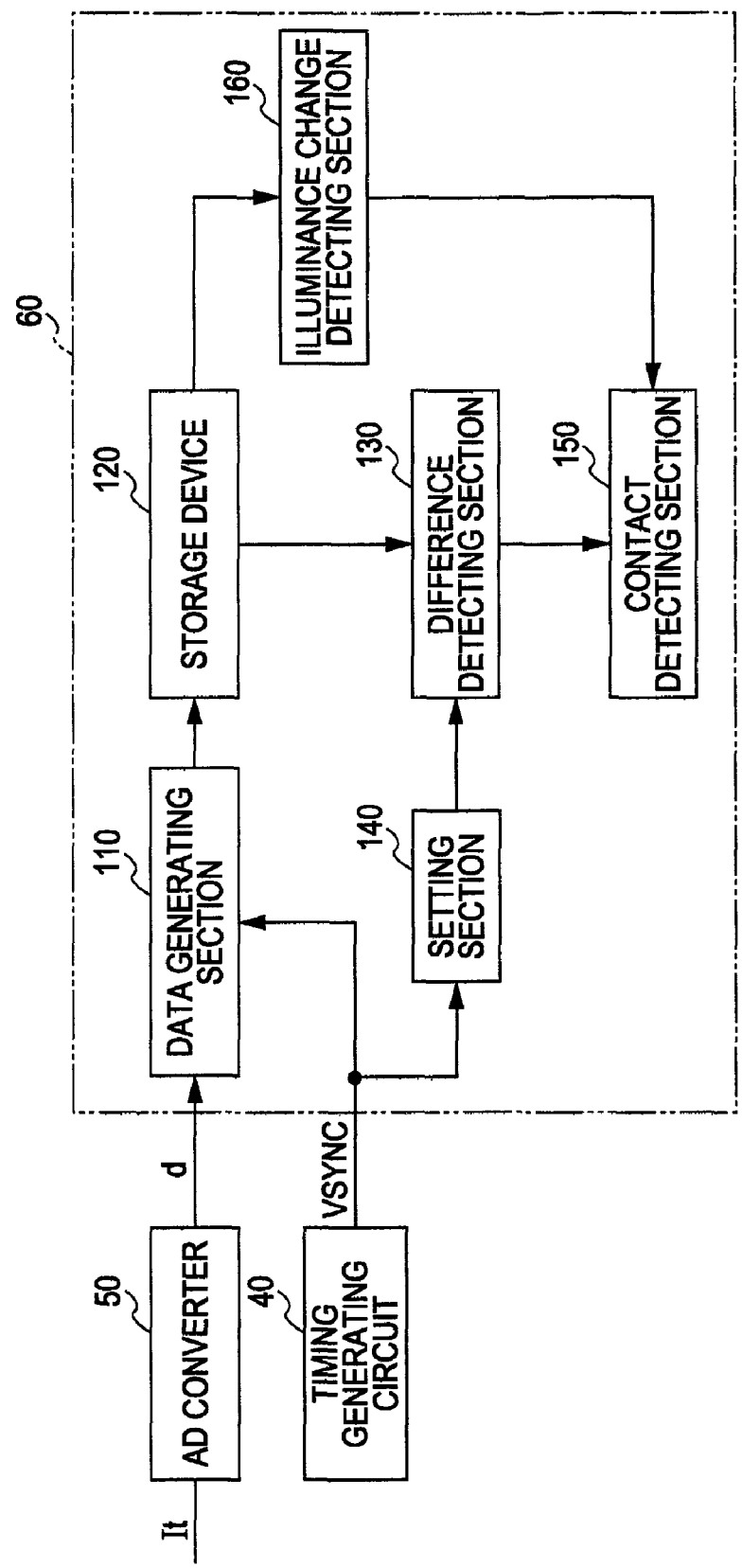
FIG. 11 is a diagram illustrating a configuration of a sensing circuit according to a second embodiment.

FIG. 11 is a block diagram illustrating a configuration of the sensing circuit 60 according to a second embodiment of the invention. The configuration of the sensing circuit 60 according to the second embodiment is different from that according to the first embodiment in that the sensing circuit 60 has an illuminance change detecting section 160 for detecting change in the environmental illuminance. Since the other configurations are the same as that of the first embodiment, description thereof will be omitted. Furthermore, the environmental illuminance is defined as the normal amount of light incident on the detection region 100 from the outside.

The illuminance change detecting section 160 detects change in the environmental illuminance on the basis of the sensing data SD generated in the data generating section 110. More specifically, the detection procedure is as follows. The illuminance change detecting section 160 reads out the sensing data SD, which is generated in the current unit period T, from the storage device 120 for each unit period T, and specifies a maximum frequency value by generating a histogram of the detection values d constituting the read sensing data SD. In the embodiment, the area of the detection region 110 is sufficiently larger than the area of the object. Hence, the maximum frequency value is used as environmental illuminance data representing the environmental illuminance. In addition, the illuminance change detecting section 160 calculates a difference value between the environmental illuminance data in the current unit period T and the environmental illuminance data in the unit period T just previous to the current unit period T, for each unit period T. Then when the difference value is not less than a predetermined reference value, the illuminance change detecting section 160 notifies the contact detecting section 150 of the change in the environmental illuminance.

Figure 12:
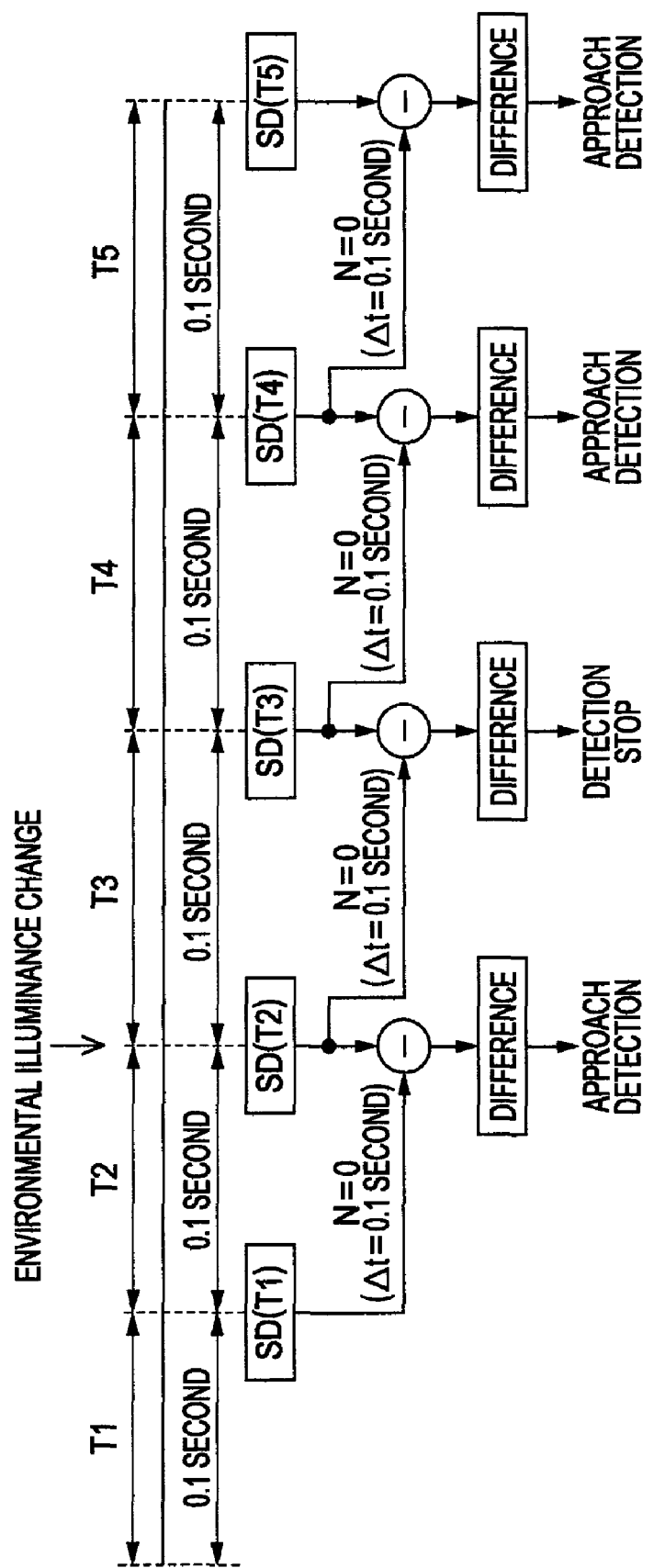
FIG. 12 is a diagram illustrating an operation of the sensing circuit according to the second embodiment.

The contact detecting section 150 stops the approach detection during a period from the current unit period T to the unit period T subsequent to the current unit period T by the differential unit period number N when the illuminance change detecting section 160 detects the change in the environmental illuminance. FIG. 12 is a diagram illustrating an operation Performed when the environmental illuminance changes at the time of the start of the unit period T3 in an aspect in which the differential unit period number N is set to "0". In this case, as shown in FIG. 12, the contact detecting section 150 stops the approach detection only in the unit period T3, and restarts the approach detection from the time point (the end point of the unit period T4 in FIG. 12) at which the sensing data SD in the unit period T3 is used for the approach detection as temporally preceding data. Specifically, in the embodiment, the approach detection, which uses the difference data between the sensing data SD in the unit period T after the change in the environmental illuminance and the sensing data SD in the unit period T before the change in the environmental illuminance, is not performed.

Figure 13:
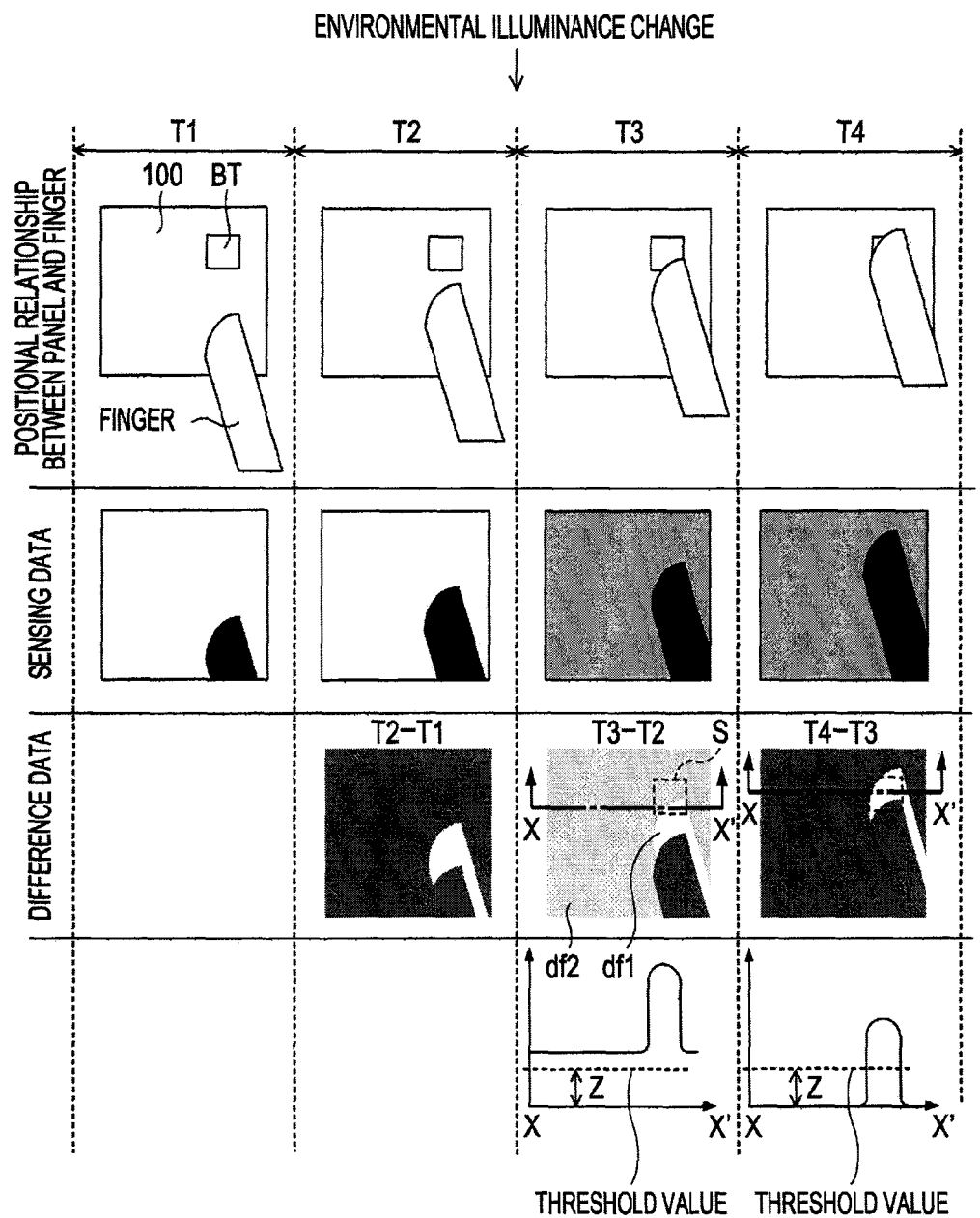
FIG. 13 is a diagram illustrating a feature at the time of a change in environmental illuminance in a comparative example.

Here, an aspect (hereinafter, it is referred to as a "comparative example 2") is considered in which the approach detection is performed for each unit period T regardless of change in the environmental illuminance. FIG. 13 is a diagram illustrating the condition where the environmental illuminance changes (it changes to be dark in FIG. 13) at the time of the start of the unit period T3, in the comparative example 2 in which the differential unit period number N is set to "0". In FIG. 13, the user's finger (the object) approaches the operation button BT during the unit periods T1 to T4, and comes into contact with the operation button BT in the unit period T4. As shown in FIG. 13, in the comparative example 2, the amount of light received by the optical detection circuits P within the surrounding region change between the unit period T2 and the unit period T3. Thereby, the difference value between the detection values d, which represent the amount of light received by the optical detection circuits P within the surrounding region, becomes larger than the threshold value Z. Thus, the area of the overlapped region between the region S and the region (the region df1 and region df2 shown in FIG. 13), which corresponds to the difference value not less than the threshold value Z in the difference data between the unit period T2 and the unit period T3, is ⅔ or more of the region S. Hence, it is falsely detected that the object is coming into contact with the region S even when the area of the overlapped region between the region S and the region df1, which corresponds to the movement of the object in the difference data, does not reaches-⅔ of the region S.

In the embodiment, when the difference value of the environmental illuminance data is not less than a predetermined reference value (for example, a threshold value Z), the change in the environmental illuminance is detected. In this case, the approach detection is stopped during the period from the current unit period T to the unit period T subsequent to the current unit period T by the differential unit period number N. There is an advantage that it is possible to prevent false detection results from being continuously output during this period.

Figure 14:
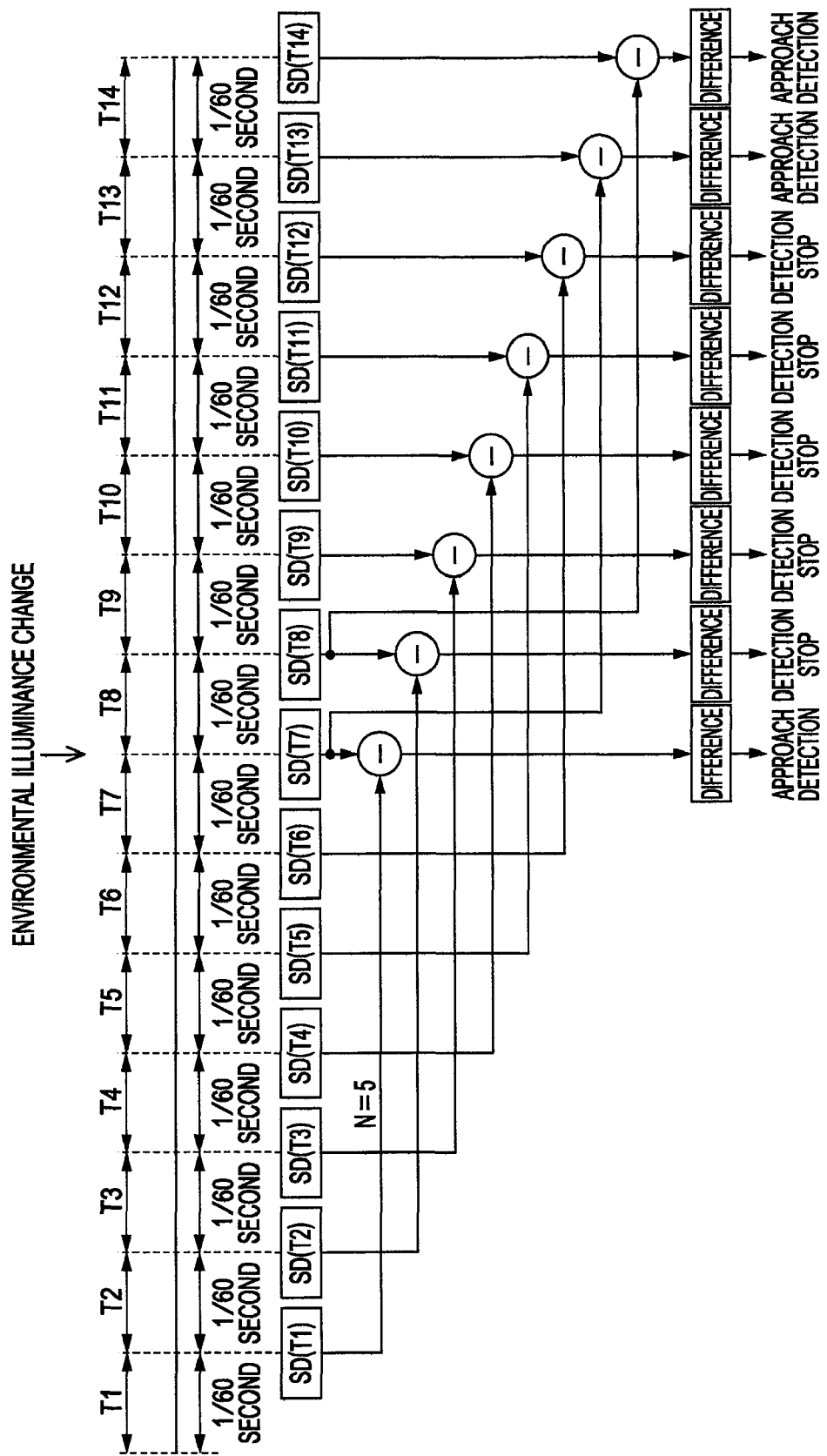
FIG. 14 is a diagram illustrating another example of the sensing circuit according to the second embodiment.

Furthermore, in the embodiment, the aspect is exemplified in which the differential unit period number N is set to "0". However, the differential unit period number N may be variably set similarly to the first embodiment. FIG. 14 is a diagram illustrating an operation performed when the environmental illuminance changes at the time of the start of the unit period T8 in the aspect in which the differential unit period number N is set to "5". In this case, as shown in FIG. 14, the approach detection is stopped during the period from the unit period T8 to the unit period T13 subsequent thereto by five unit periods. Consequently, even in the aspect shown in FIG. 14, the approach detection, which uses the difference data of the sensing data SD before and after the change of the environmental illuminance, is not performed.

C. Modified Examples

The invention is not limited to the above-mentioned embodiment, and for example, may be modified as follows. Further, two or more modified examples among the following modified examples may be combined.

1. Modified Example 1

Figure 15:
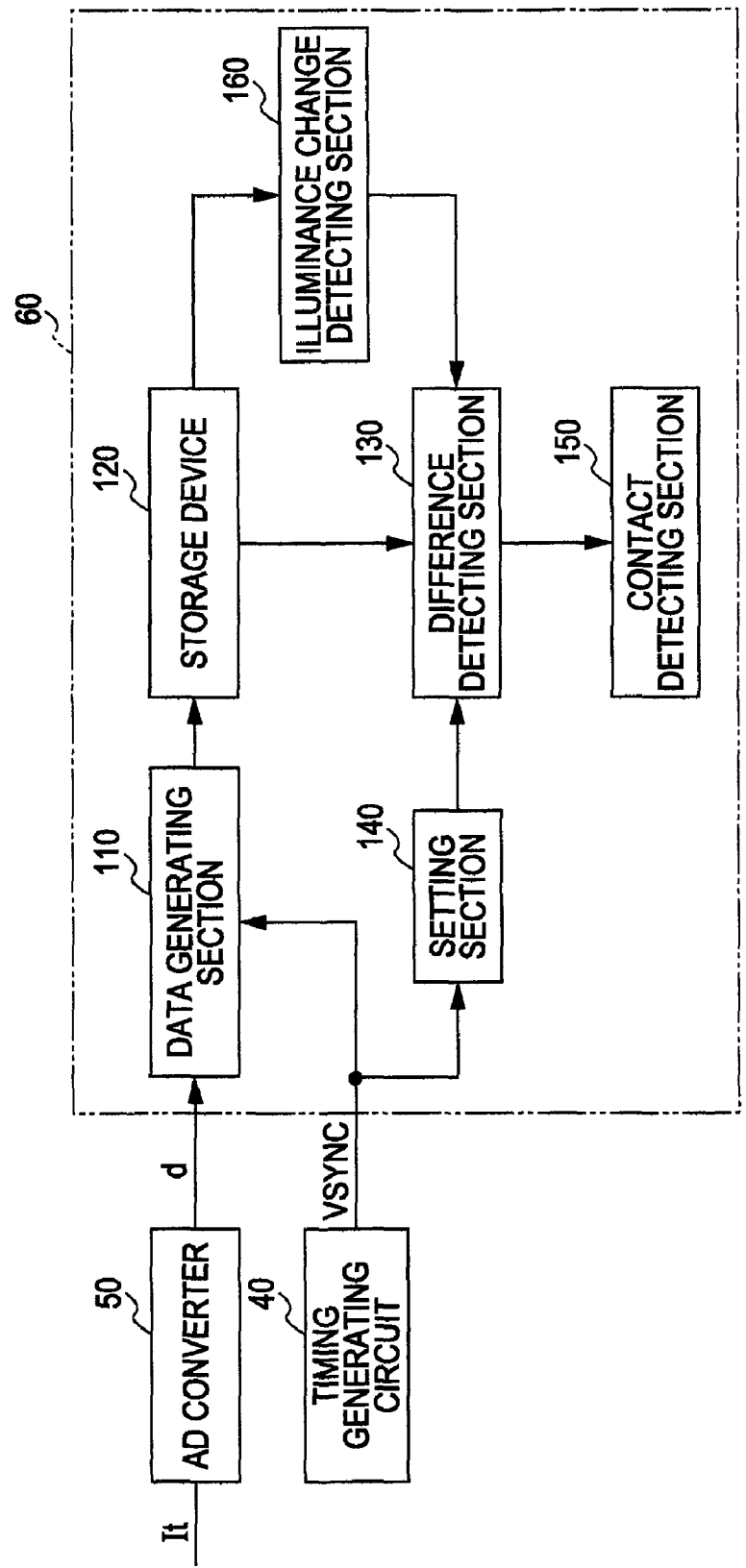
FIG. 15 is diagram illustrating an operation of a sensing circuit according to a modified example of the invention.

FIG. 15 is a block diagram illustrating a configuration of the sensing circuit 60 according to a modified example of the invention. In the aspect shown in FIG. 15, the illuminance change detecting section 160 notifies the difference data generating section 130 of the change in the environmental illuminance when the difference value of the environmental illuminance data in each of the two unit periods T adjacent to each other is not less than a predetermined reference value. In this point, this aspect is different from the above-mentioned second embodiment.

When the illuminance change detecting section 160 detects the change of the environmental illuminance, the difference data generating section 130 stops generating the difference data during the period from the current unit period T to the unit period T subsequent to the current unit period T by the differential unit period number N. Thereby, the contact detecting section 150 is unable to perform the approach detection during the period (detection stop). The difference data generating section 130 does not perform the process of generating the difference data or the operation of reading the sensing data in each of the two unit periods T having the difference to be acquired during the period. Hence, there is an advantage that electric power consumption is reduced in the difference data generating section 130 as compared with the second embodiment.

In sum, when the illuminance change detecting section 160 detects the change in the environmental illuminance, it is preferred that the approach detection be stopped during the period from the current unit period T to the unit period T subsequent to the current unit period T by the differential unit period number N.

2. Modified Example 2

In the above-mentioned embodiments, the aspect is exemplified in which the setting section 140 automatically sets the differential unit period number N. However, for example, the differential unit period number N may be determined in a way that the setting section 140 does not automatically set the differential unit period number N and a user inputs the unit period number N to the setting section 140. In this aspect, for example, when the sensing circuit 60 is assembled in the panel in which the time length of each unit period T is set to 0.1 second, the user inputs the differential unit period number "0" to the setting section 140. Further, for example, when the sensing circuit 60 is assembled in the panel in which the time length of each unit period T is set to 1/60 second, the user inputs the differential unit period number "5" to the setting section 140. In sum, it is preferred that the differential unit period number N be set variably.

3. Modified Example 3

In the above-mentioned embodiments, the contact detecting section 150 detects the approach between the object and the region S which corresponds to the operation button BT displayed on the detection region 100. However, the region which is subjected to the approach detection may be optionally set in the detection region 100. For example, the approach of the object may be detected in the whole range of the detection region 100.

D. Electronic Apparatus

Figure 16:
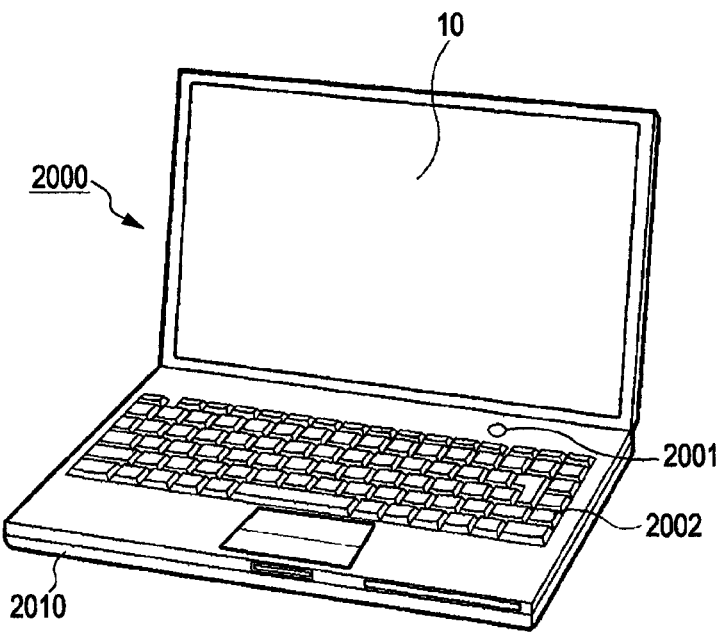
FIG. 16 is a perspective view illustrating a specific example of an electronic apparatus according to an embodiment of the invention.

Next, an electronic apparatus using the display device 10 according to an aspect of the invention will be described. FIG. 16 is a perspective view illustrating a configuration of a mobile type personal computer using the display device 10 according to any one of the aspects mentioned above. The personal computer 2000 includes the display device 10 and a main body 2010. The main body 2010 includes a power switch 2001 and a keyboard 2002.

Figure 17:
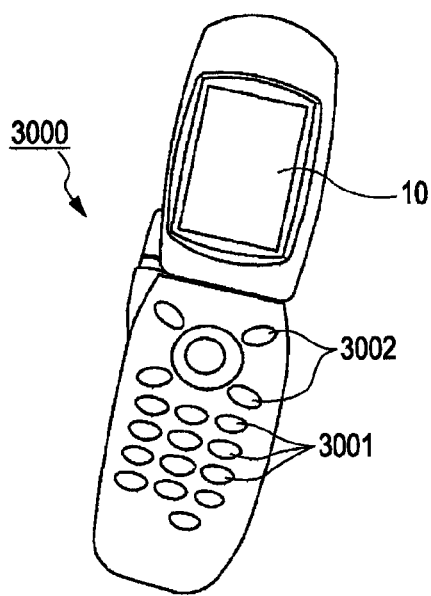
FIG. 17 is a perspective view illustrating a specific example of an electronic apparatus according to an embodiment of the invention.

FIG. 17 shows a configuration of a mobile phone using the display device 10 according to the aspect of the invention. The mobile phone 3000 includes a plurality of operation buttons 3001 and scroll buttons 3002, and an electro-optical device (display device) D. By operating the scroll buttons 3002, the screen displayed on the display device 10 is scrolled.

Figure 18:
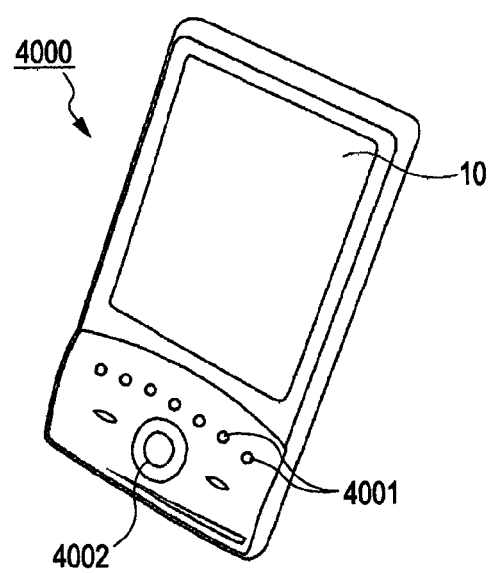
FIG. 18 is a perspective view illustrating a specific example of an electronic apparatus according to an embodiment of the invention.

FIG. 18 shows a configuration of a portable information terminal (PDA: Personal Digital Assistants) using the display device 10 according to the aspect of the invention. The portable information terminal 4000 includes a plurality of operation buttons 4001 and a power switch 4002, and the display device 10. When the power switch 4002 is operated, various types of information such as an address book and a schedule note are displayed on the display device 10.

Examples of electronic apparatuses suitable for using the display device according to the aspect of the invention include not only the electronic apparatuses shown in FIGS. 16 to 18 but also: a digital still camera; a television; a video camera; a car navigation system; a pager; an electronic personal organizer; an electronic paper; an electronic calculator; a word processor; a workstation; a video telephone; a POS terminal; a printer; a scanner; a copier; a video player; a device with a touch panel; and the like.

The entire disclosure of Japanese Patent Application No. 2008-296388, filed Nov. 20, 2008 is expressly incorporated by reference herein.

What is claimed is:

1. A sensing circuit comprising:
   a data generating section for generating data representing the amount of light received by a plurality of optical detection circuits, which are provided in a detection region, for each unit period on the basis of detection signals output from the plurality of optical detection circuits;
   a setting section for variably setting a differential unit period number which is the number of unit periods between two unit periods having a difference to be acquired;
   a difference data generating section for sequentially generating difference data between the data, which is generated by the data generating section in the current unit period, and the data, which is generated by the data generating section in the unit period previous to the current unit period by the differential unit period number, for each of a plurality of the unit periods; and
   an approach detecting section for detecting whether or not an object approaches the detection region on the basis of the difference data generated by the difference data generating section.

2. The sensing circuit according to claim 1, wherein the setting section variably sets the differential unit period number in accordance with the time length of the unit period.

3. The sensing circuit according to claim 1, wherein the setting section sets the differential unit period number to a larger value as a time length of the unit period becomes shorter.

4. The sensing circuit according to claim 1, wherein the approach detecting section detects that the object approaches a sensing region, which is at least a part of the detection region, when an area of an overlapped region between the sensing region and another region, which corresponds to movement of the object in the difference data generated by the difference data generating section, is not less than a predetermined value.

5. The sensing circuit according to claim 1, further comprising an illuminance change detecting section for detecting change in an environmental illuminance on the basis of the data generated by the data generating section,
   wherein the approach detecting section stops detecting whether an object is approaching the detection region, during a period from the current unit period to the unit period subsequent to the current unit period by the differential unit period number, when the illuminance change detecting section detects a change in the environmental illuminance.

6. A display device comprising the sensing circuit according to claim 1.

7. An electronic apparatus comprising the display device according to claim 6.

* * * * *